June 14, 1955 J. T. PURVIS 2,710,523
GAS TURBINE TAIL CONE
Filed Sept. 27, 1951 2 Sheets-Sheet 1
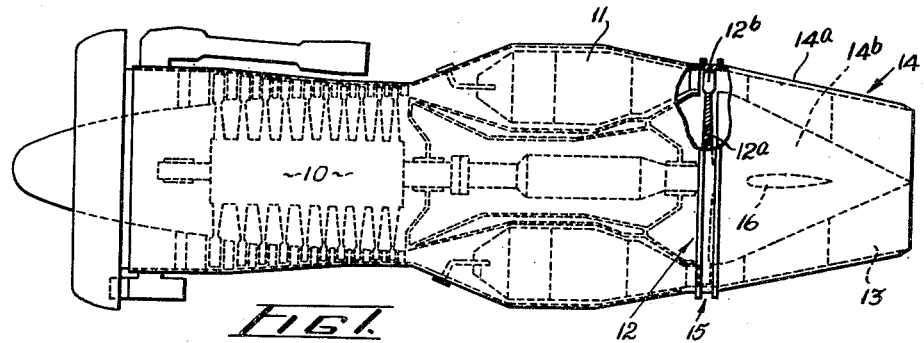
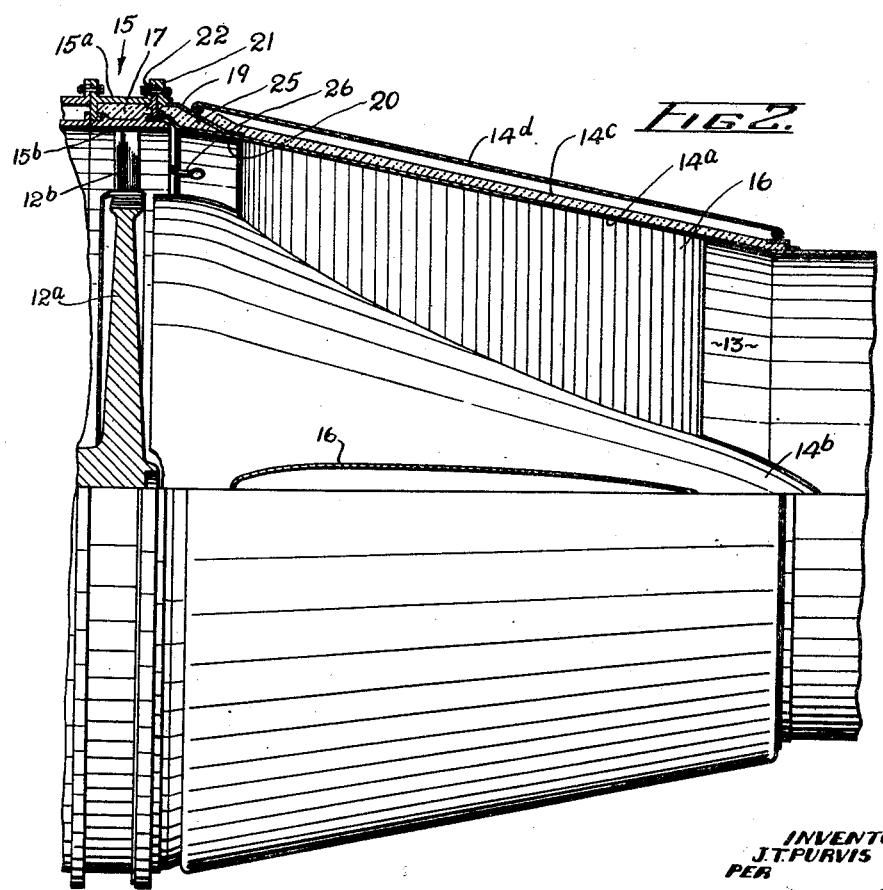
INVENTOR
J.T. PURVIS
PER
ATTORNEY June 14, 1955   J. T. PURVIS   2,710,523
GAS TURBINE TAIL CONE Filed Sept. 27, 1951   2 Sheets-Sheet 2

INVENTOR
J. T. PURVIS
PER

ATTORNEY.

United States Patent Office 2,710,523
Patented June 14, 1955

2,710,523

GAS TURBINE TAIL CONE

Joseph Thompson Purvis, Toronto, Ontario, Canada, assignor to A. V. Roe Canada Limited, Malton, Ontario, Canada, a corporation Application September 27, 1951, Serial No. 248,535

4 Claims. (Cl. 60—35.6)

This invention relates to gas turbine engines and in particular to the tail cones and to the mounting of the tail cones at their forward or upstream ends.

The blading of an axial flow gas turbine is customarily mounted on the periphery of a rotor disc and is closely shrouded, around its outer circumference, by a stationary shroud ring. The shroud ring not only provides an outer boundary for the annular passage in which the turbine blades are situated but also acts as a structural unit of the engine, having a member whereby the tail cone is supported; it is therefore necessary to construct the shroud ring so that its tail cone supporting member is protected from direct contact with the hot gases passing through the turbine, because the strength of the member would be impaired by overheating. A considerable temperature differential would exist at the attachment between the said member and the walls of the tail cone which it supports if the attachment were exposed directly to the hot gases. Accordingly the forward terminal portion of the tail cone is usually double skinned, the inner skin being directly exposed to the hot gases and the outer skin being insulated from the inner skin and being provided with a flange which is secured to the tail cone supporting member of the shroud ring.

The forward lip of the inner skin of tail cones heretofore constructed is not directly supported by the shroud ring but is beaded or otherwise stiffened and is of slightly larger diameter than the inner surface of the shroud ring. It is therefore free to expand independently of the shroud ring and of the outer skin of the tail cone and, provided that this expansion is uniform around the circumference, the slight "step" due to the different diameters of the inner surface of the shroud ring and of the lip will ensure that the high velocity gases leaving the turbine will always be contained within the tail cone. However, the presence of this step provides a discontinuity in the outer boundary of the annular passage provided by the shroud ring and the inner skin of the tail cone, and any buckling or lack of uniformity in the expansion of the beaded lip will seriously affect the diffusion of gases downstream of the turbine, thereby adversely affecting engine performance. Moreover if such distortion is so severe as to cause the lip to be depressed locally within the radius of the inner surface of the shroud ring, the high velocity exhaust gases will "get under" the lip and fold it back, causing considerable damage to the tail cone and serious loss of power to the engine.

A main object of this invention is to provide a means of attachment of the tail cone to the shroud ring which will obviate any risk of distortion of the boundry of the annular passage through which the exhaust gases pass, at the same time minimizing any step or similar discontinuity in the smooth surface of the said passage. Other objects and advantages of the invention will become apparent in the course of the following description.

In the accompanying drawings forming a part of this specification, and in which like characters of reference are used to designate like parts in the several views:

Fig. 1 is a side view of a gas turbine engine, partly cut away to show the application of the invention;

Fig. 2 is an enlarged partly sectional view of the tail cone, turbine and shroud ring of the engine shown in Fig. 1;

Figure 3:
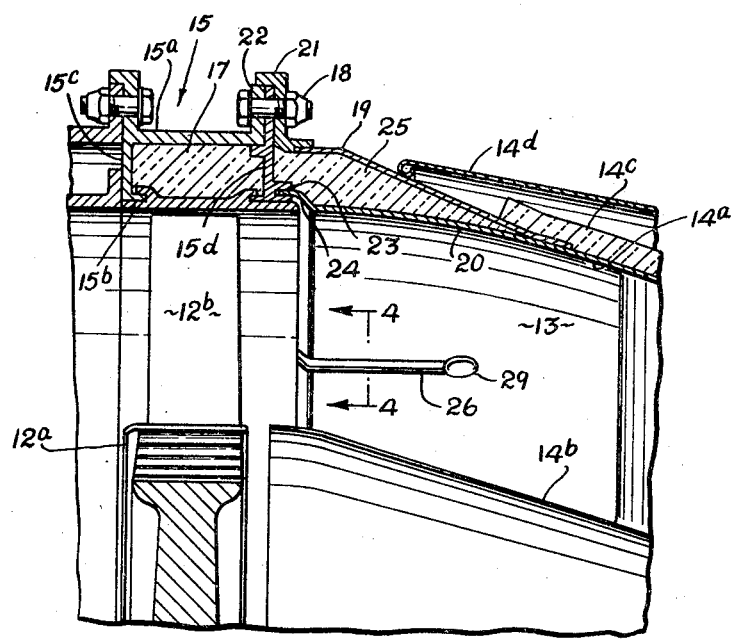
Fig. 3 is a sectional view, further enlarged, showing details of the tail cone attachment to the shroud ring.

In a gas turbine engine, as depicted in Fig. 1, air is drawn in and compressed by a compressor 10, fuel is introduced into the compressed air in a combustion system 11 and the mixture of fuel and air is ignited, causing rapid acceleration of the gases and their discharge through a turbine generally indicated at 12. The turbine consists of a disc 12a and blading 12b and drives the compressor, fuel pump and other devices. The exhaust gases are discharged through an annular passage 13 in a tail cone generally indicated at 14; in some engines the exhaust may be used as a jet to generate a propulsive thrust.

As best shown in Fig. 2, the tail cone comprises an outer frusto-conical member 14a and an inner conical member 14b, known as the tail bullet, which provides a fairing downstream of the turbine disc 12a. The outer member 14a is surrounded by insulating material 14c and a frusto-conical sheath 14d having inwardly rolled ends. The turbine blading 12b is carried on the periphery of the disc 12a and extends radially across the upstream end of the annular passage 13. Surrounding the blading a shroud ring, generally indicated at 15, supports the outer member 14a of the tail cone; the inner member 14b is supported from the outer member through struts 16 which are of streamlined section and are usually arranged in cruciform across the passage 13. Thus it will be seen that the whole tail cone structure is supported on the engine at the forward peripheral joint between the outer member 14a and the shroud ring 15.

The construction of the said joint is shown in Figs. 2 and 3. The shroud ring 15 consists of an outer tail cone supporting ring 15a and an inner ring 15b. The inner ring is supported by an inwardly extending flange 15c on the forward edge of the outer ring 15a and by an annular retaining ring 15d secured at the rear of the outer ring. The inner ring 15b is thereby spaced from the ring 15a, and the space between the rings is filled with insulating material 17 so that the outer ring is protected from the hot gases flowing through the turbine blading. The inner ring 15b extends below the retaining ring 15d and protects it from the hot gases. Thus, the inner ring 15b gets very hot but carries no load, and the outer ring 15a, which does carry load, is protected from the hot gases by the inner ring.

The forward terminal portion of the outer member 14a of the tail cone has an outer skin 19 and an inner skin 20. The outer skin 19 terminates by an outwardly extending flange 21 which is attached by bolt and nut assemblies 18 to a similar flange 22 on the outer ring 15a of the shroud ring. The annular retaining ring 15d is interposed between the flanges 21 and 22, and at its inner periphery carries an annularly grooved, rearwardly extending flange 23; the annular groove is located in the rearwardly-facing surface of the said flange.

The inner skin 20 of the tail cone is joggled outwardly along its forward edge to form a forward tongue or lip 24. The lip 24 is accommodated in the annular groove of the retaining ring 15d so that it is radially supported by the flange 23, but because of the circumferential joggle of the inner skin, the major inner surface of the inner skin is substantially flush with the inner surface of the inner ring 15b of the shroud ring.

Figure 4:
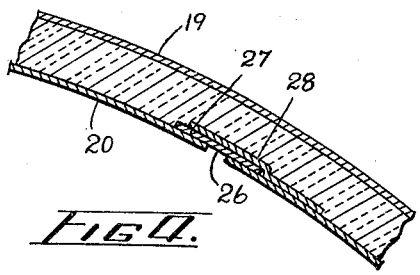
Fig. 4 is a sectional view, taken along the line 4—4 in Fig. 3.

The triangular-sectioned, annular space between the outer skin 19 and the inner skin 20 is filled with insulating material 25. Since the inner skin is in intimate contact with the hot exhaust gases, but the grooved flange 23 in which it is radially supported is more protected, the inner skin will expand to a greater extent than the flange. Since radial expansion of the inner skin is prevented by the flange 23, the outwardly and inwardly facing surfaces of the lip 24 engaging opposite walls of the groove in the flange, it is necessary to provide for circumferential expansion, to which end the inner skin is provided with axially disposed slots 26, and a small terminal hole is drilled at the end of each slot to prevent cracking of the metal of which the skin is constructed. To protect the relatively soft insulating material 25 against any ingress of the exhaust gases, overlapping plates 27 and 28 shown in Fig. 4, are provided on the outer surface of the inner skin to cover the slots 26, and a flush rivet 29 is inserted in the terminal hole of each slot.

The groove in the flange 23 is, of course, of sufficient depth to allow axial expansion of the skin 20, without abutment of the forward end of the lip 24 against the bottom of the groove.

The whole tail cone assembly is supported from the engine by the flange 21 and the outer skin 19. Both the skin 19 and the flange 21 are protected against overheating by the insulating material 25. The inner skin 20, on the other hand, is directly exposed to the hot exhaust gases from the turbine 12, but this skin is not required to carry any load. Moreover this inner skin is supported radially by the grooved flange 23 of the retaining ring 15d and is free to expand circumferentially relative thereto, by virtue of the slots 26. Thus the relative radial positions of the inner skin and the inner ring 15b of the shroud ring remain unchanged during all conditions of operation, giving an invariably flush surface to the passage through which the gases flow, free from discontinuities or local distortion. There is also no risk of the high velocity gases "getting under" the forward lip of the inner skin and folding the skin back, since the lip is always covered by the grooved flange 23.

It will be understood that the form of the invention herein shown and described is to be taken as a preferred example of the same and that various changes in the arrangement and size of the parts may be resorted to without departing from the spirit of the invention or the scope of the subjoined claims.

What I claim as my invention is:

1. In a gas turbine engine, a turbine, a shroud ring surrounding the turbine, and a tail cone rearward of the turbine and of the shroud ring through which the exhaust gases from the turbine are discharged, the said shroud ring including in spaced relationship an inner ring adjacent the turbine and an outer ring, and the said tail cone including a forward terminal portion having in spaced relationship an inner skin wherein the said exhaust gases are contained and an outer skin connected to the outer ring of the shroud ring, insulating material located within the space between the said skins, a rearwardly extending annular flange mounted on the shroud ring adjacent the inner ring thereof, the said flange having a rearwardly-facing annular groove of slightly greater diameter than the inner surface of the said inner ring, the major inner surface of the inner skin being substantially flush with the said inner surface of the inner ring, the inner skin having an outward circumferential joggle at its forward end forming a lip registering with the said groove and radially supported therein, the inner skin having substantially axially disposed slots to accommodate circumferential expansion and contraction relative to the said flange, and plates on the outer surface of the inner skin and overlapping the said slots to obstruct the escape of gas therethrough.

2. In a gas turbine engine, a turbine, a shroud ring surrounding the turbine, and a tail cone rearward of the turbine and of the shroud ring through which exhaust gases from the turbine are discharged, the tail cone including a forward terminal portion having in spaced relationship an inner skin wherein the exhaust gases are contained and an outer skin connected to the shroud ring; the shroud ring and the iner skin having a peripheral tongue-and-groove connection comprising a radially outwardly facing surface of the shroud ring, a radially inwardly facing surface of the inner skin engaging said outwardly facing surface of the shroud ring whereby movement of the inner skin radially inwardly relative to the shroud ring is prevented, a radially inwardly facing surface of the shroud ring, and a radially outwardly facing surface of the inner skin engaging said inwardly facing surface of the shroud ring whereby movement of the inner skin radially outwardly relative to the shroud ring is prevented, the engagement of said surfaces of the tongue-and-groove connection being a slidable engagement circumferentially of the inner skin, and the inner skin having means for accommodating expansion and contraction of the inner skin in a circumferential sense relative to the shroud ring.

3. In a gas turbine engine, a turbine, a shroud ring surrounding the turbine, and a tail cone rearward of the turbine and of the shroud ring through which exhaust gases from the turbine are discharged, the tail cone including a forward terminal portion having in spaced relationship an inner skin wherein the exhaust gases are contained and an outer skin connected to the shroud ring; the shroud ring and the inner skin having a peripheral tongue-and-groove connection comprising a radially outwardly facing surface of the shroud ring, a radially inwardly facing surface of the inner skin engaging said outwardly facing surface of the shroud ring whereby movement of the inner skin radially inwardly relative to the shroud ring is prevented, a radially inwardly facing surface of the shroud ring, and a radially outwardly facing surface of the inner skin engaging said inwardly facing surface of the shroud ring whereby movement of the inner skin radially outwardly relative to the shroud ring is prevented, the engagement of said surfaces of the tongue-and-groove connection being a slidable engagement circumferentially of the inner skin, the inner skin having substantially axially disposed slots for accommodating expansion and contraction of the inner skin in a circumferential sense relative to the shroud ring, and plates on the outside of the inner skin and overlapping the slots to obstruct the escape of gas therethrough.

4. In a gas turbine engine, a turbine, a shroud ring surrounding the turbine, and a tail cone rearward of the turbine and of the shroud ring through which exhaust gases from the turbine are discharged, the tail cone including a forward terminal portion having in spaced relationship an inner skin wherein the exhaust gases are contained and an outer skin connected to the shroud ring, the shroud ring having a rearwardly-facing circumferential groove and the inner skin having an outward circumferential joggle at its forward end forming a lip registering with the groove, the lip having a radially outwardly facing surface and a radially inwardly facing surface both of which engage walls of the groove whereby the inner skin is held against movement both radially inwardly and radially outwardly relative to the shroud ring, the lip being slidable in the groove in a circumferential sense and the inner skin being slotted from the lip in an axial direction to accommodate expansion and contraction of the inner skin in the circumferential sense.

References Cited in the file of this patent

UNITED STATES PATENTS

| | | |
|---|---|---|
| 2,427,244 | Warner | Sept. 9, 1947 |
| 2,442,019 | Ray | May 25, 1948 |
| 2,488,875 | Morley | Nov. 22, 1949 |
| 2,494,659 | Huyton | Jan. 17, 1950 |
| 2,584,899 | McLeod | Feb. 5, 1952 |
| 2,620,157 | Morley et al. | Dec. 2, 1952 |
| 2,625,793 | Mierley et al. | Jan. 20, 1953 |